(No Model.)
J. S. MILLER & E. LAPHAM.
SAW MILL.
No. 332,161. Patented Dec. 8, 1885.
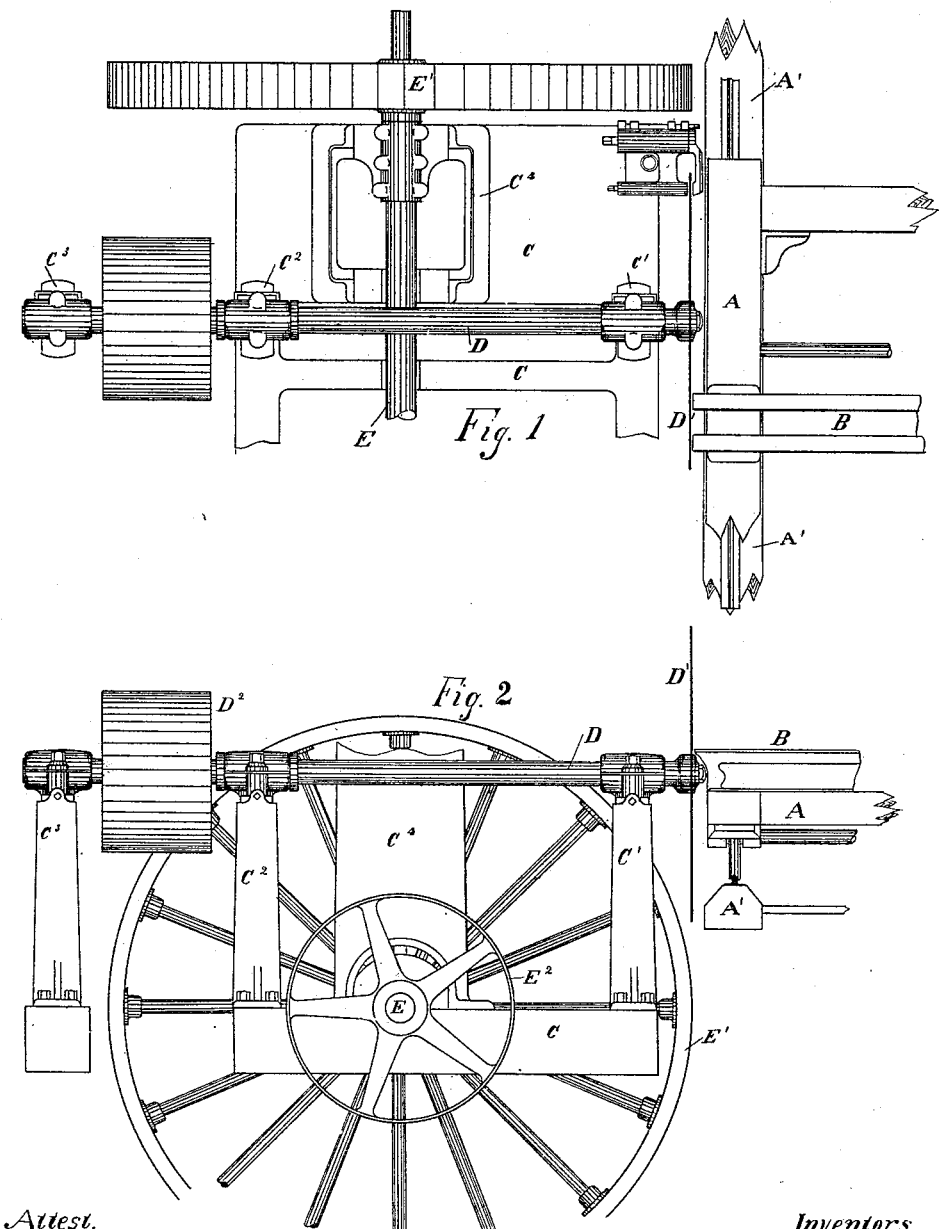
Attest.
L. D. Hanford
F. T. Chapman
Inventors.
Jas. S. Miller
E. Lapham
Per. Hallock & Hallock
Att's.

UNITED STATES PATENT OFFICE.

JAMES S. MILLER, OF ERIE, PENNSYLVANIA, AND EDWARD LAPHAM, OF CADILLAC, MICHIGAN, ASSIGNORS TO THE STEARNS MANUFACTURING COMPANY, OF ERIE, PENNSYLVANIA.

SAW-MILL.

SPECIFICATION forming part of Letters Patent No. 332,161, dated December 8, 1885.

Application filed September 12, 1885. Serial No. 176,922. (No model.)

*To all whom it may concern:*

Be it known that we, JAMES S. MILLER and EDWARD LAPHAM, citizens of the United States, residing, respectively, at Erie, in the county of Erie and State of Pennsylvania, and at Cadillac, in the county of Wexford and State of Michigan, have invented certain new and useful Improvements in Combined Circular and Band Saw Mills; and we do hereby declare the following to be a full, clear, and exact description of the invention, such as will enable others skilled in the art to which it appertains to make and use the same.

This invention relates to the construction of saw-mills; and it consists in the combination, in one frame-work, of the means for operating a band-saw and the means for operating a circular saw, said appliances being so arranged that either kind of saw may be adjusted on its proper operating mechanism and used for sawing logs on the same carriage.

The object of the invention is as follows: A band-saw is best adapted for sawing large logs, while a circular or buzz saw is best for sawing small logs. In large mills it is common to have two saw-mills, one a band-saw, and the other a circular saw; but in small mills this is impractical, besides necessitates a large outlay of capital. By providing a mill which can be run as either a circular or as a band mill, using the same carriage and head-blocks, the advantages of two separate mills can be secured, adding but little to the cost of the plant.

Our invention is illustrated in the accompanying drawings, as follows:

Figure 1 is a top or plan view of so much of our mill as is necessary to illustrate our construction. Fig. 2 is an elevation view showing the same parts.

The construction is as follows: A is the log-carriage; A', the carriage-way, and B the head-block on the carriage. C C' C² C³ C⁴ is the frame-work supporting the saws and their operative mechanism, C being the bed-frame or "husk," so called; C', C², and C³, the pillow-blocks of the circular saw arbor, and C⁴ the column of the band-saw frame-work, which latter part is broken off, as it is unnecessary to show its full length or the band-wheel mounted upon it. D is the circular-saw arbor; D', the circular saw, and D² the driving-pulley on that arbor. E is the main driving-shaft of the band-saw, and is journaled on the bed-piece C, and lies at right angles to the arbor D, and below it. E' is the main band-wheel, and E² is the driving-pulley of the main shaft E. The band-saw is not shown, as the circular saw is in place, and both saws will never be in place at the same time. It will be seen, however, that each saw will, when in place, be in the same vertical plane as the other saw will occupy when it is in place, or, in other words, each saw will be in the saw-line of the carriage.

In using this mill the operators will cull the logs before they are brought into the mill, keeping back, we will say, those that they desire to saw with the circular saw, while they are using the band-saw, and then, when they desire to make a change, they will take the band-saw off from the band-wheels and throw off the belt that runs the shaft E, and put the circular saw D' on the arbor D and the belt which runs the arbor D, and then they can bring in the logs kept back and saw them on the same carriage as before.

We are aware that sawing-machines have been made having two or more kinds of saws therein operated from the same driving-gear— as, for example, in the patent to Austin, January 23, 1883, the patent to Bean, May 6, 1884, and in the patent to Heayson, April 7, 1874; but such constructions in no wise comprise the rationale of our conception.

We do not claim the combination, in one mechanism, of means for operating two kinds of saws, broadly considered.

The spirit or gist of our invention consists in the combination, with a saw-mill log-carriage, of the necessary appliances for operating a band-saw, and the necessary appliances for operating a circular saw, which are so adjusted upon a frame-work with relation to the log-carriage that a saw mounted on either of said appliances will be in position to operate upon a log on the said carriage in the same manner as the other saw would if mounted on the other appliances.

No such arrangement of parts or the object and purpose of our invention is contemplated in the mechanism seen in the patents above referred to, and those mechanisms are totally incapable of performing the functions performed by our device. The advantage of this construction is, that for a comparatively small additional cost a mill can be furnished on which logs of various sizes can be sawed at the best advantage.

What we claim as new is—

1. In a saw-mill, the combination, substantially as set forth, of a reciprocating log-carriage, a supporting frame-work at one side of said carriage, a circular-saw-driving mechanism, and a band-saw-driving mechanism mounted on said frame-work in a manner, substantially as set forth, whereby the saws driven by said mechanisms will operate in a common vertical plane lying between said carriage and the said frame-work.

2. In a saw-mill, the combination, substantially as set forth, of the reciprocating log-carriage A, with blocks B, mounted thereon, the frame-work C C' $C^2$ $C^3$ $C^4$ at the side of said carriage, a circular-saw arbor, D, and a band-saw driving-shaft, E, mounted on said frame-work in position, as shown, to operate the said saws in a vertical plane lying between the said frame-work and the said log-carriage.

In testimony whereof we affix our signatures in presence of two witnesses.

JAMES S. MILLER.
EDWARD LAPHAM.

Witnesses to Miller:
   JNO. K. HALLOCK,
   ROBT. H. PORTER.
Witnesses to Lapham:
   JAMES R. BISHOP,
   HENRY KNOWLTON.